Figure 1:
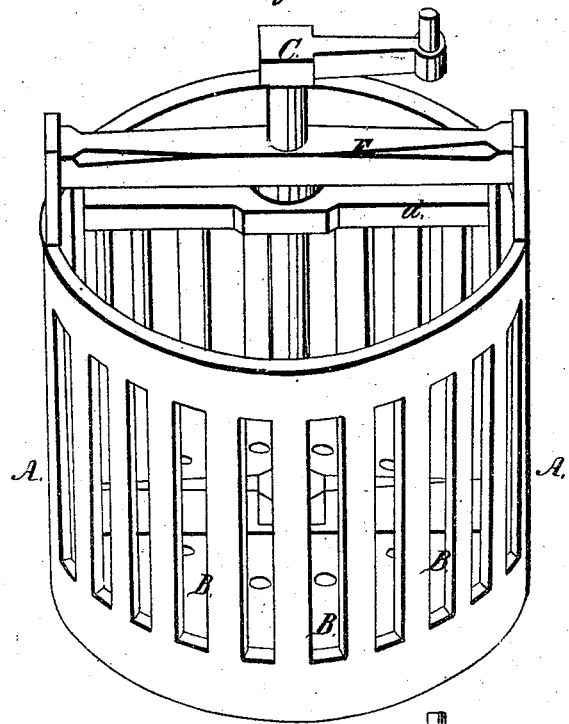
Figure 2:
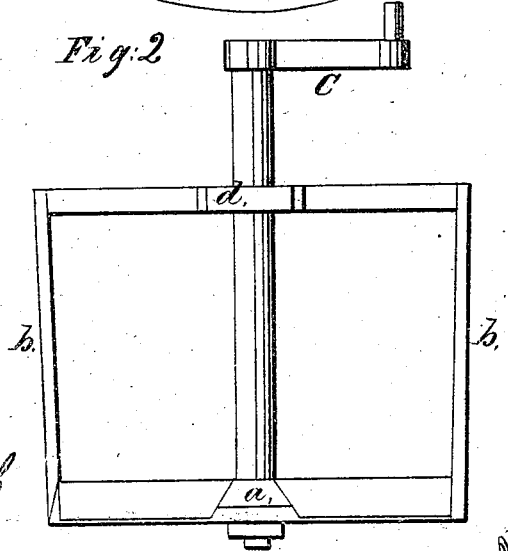

U. A. Woodbury,
Potato Washer,
Nº 77,699.     Patented May 5, 1868.

Witnesses:

Inventor:

United States Patent Office.

U. A. WOODBURY, OF MORRISVILLE, VERMONT.

Letters Patent No. 77,099, dated May 5, 1868.

IMPROVED VEGETABLE-WASHER.

*The Schedule referred to in these Letters Patent and making part of the same.*

TO ALL WHOM IT MAY CONCERN:

Be it known that I, U. A. WOODBURY, of Morrisville, in the county of Lamoille, and in the State of Vermont, have invented certain new and useful Improvements in Vegetable-Washers; and do hereby declare that the following is a full, clear, and exact description thereof, reference being had to the accompanying drawings, and to the letters of reference marked thereon.

In the annexed drawings, making part of this specification, A represents a tub or bucket, the sides of which are provided with a series of slots or openings, B B. This tub or bucket is intended to be placed in any water-vessel of sufficiently large dimensions, so that water will circulate freely around it, and through its slots, B B, to reach the potatoes or vegetables which are placed within it.

A square frame is placed in the vessel or bucket A, which is composed of the bottom slat $a$, the two side slats $b\ b$, and the top slat $d$. The bottom and side slats are made triangular in shape, or V-shaped, with one angle facing the centre of the bucket.

C represents a crank-shaft, which stands, in a vertical position, in the centre of the bucket A, and which has one bearing in the bottom of the bucket, and one in a cross-bar, $e$, which is secured between standards upon the upper edge of said bucket. This shaft passes through the square frame above described, and is confined to it, so that when the shaft revolves, the frame revolves also.

The potatoes or vegetables to be washed are placed in the bucket A, and this bucket, as has been stated, is placed in a suitable water-vessel. By revolving the shaft C, the frame within the bucket is also revolved, and the angular pieces, $a$ and $b\ b$, keep the vegetables in motion until they are thoroughly cleansed of all dirt.

The bottom piece, $a$, raises the potatoes so that they have a rising and falling motion, while the side pieces move them inward, their own gravity taking them outward again, and causing them to fall after being raised.

By these two motions, caused by the revolving of the frame in either direction, the potatoes are thoroughly washed.

Having thus fully described my invention, what I claim as new, and desire to secure by Letters Patent, is—

The combination of the slotted bucket A E with the revolving frame $a\ b\ b\ d$, as described, which can be used in any water-vessel of suitable size, for the purposes specified.

In testimony that I claim the foregoing, I have hereunto set my hand, this 21st day of April, 1868.

U. A. WOODBURY.

Witnesses: